United States Patent
Massonnaud et al.

(10) Patent No.: US 10,696,213 B2
(45) Date of Patent: Jun. 30, 2020

(54) STEERING COLUMN FOR A MOTOR VEHICLE AND METHOD FOR PRODUCING A STEERING COLUMN

(71) Applicants: THYSSENKRUPP PRESTA AG, Eschen (LI); thyssenkrupp AG, Essen (DE)

(72) Inventors: Marcus Massonnaud, Feldkirch (AT); Thomas Geiselberger, St. Gallen (CH); Martin Fleischer, Balgach (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 201 days.

(21) Appl. No.: 15/769,264

(22) PCT Filed: Oct. 21, 2016

(86) PCT No.: PCT/EP2016/075325
§ 371 (c)(1),
(2) Date: Apr. 18, 2018

(87) PCT Pub. No.: WO2017/072032
PCT Pub. Date: May 4, 2017

(65) Prior Publication Data
US 2018/0297514 A1     Oct. 18, 2018

(30) Foreign Application Priority Data
Oct. 27, 2015   (DE) .................... 10 2015 220 934

(51) Int. Cl.
*B62D 1/16*     (2006.01)
*B60Q 1/42*     (2006.01)
*B60Q 1/14*     (2006.01)

(52) U.S. Cl.
CPC ............. *B60Q 1/42* (2013.01); *B62D 1/16* (2013.01); *B60Q 1/1469* (2013.01)

(58) Field of Classification Search
CPC .......... B60Q 1/42; B60Q 1/1469; B62D 1/16
See application file for complete search history.

(56) References Cited

U.S. PATENT DOCUMENTS

| | | | | |
|---|---|---|---|---|
| 5,090,730 A | * | 2/1992 | DuRocher | B62D 1/184 280/775 |
| 5,285,695 A | * | 2/1994 | Di Giusto | B60Q 1/425 200/61.27 |

(Continued)

FOREIGN PATENT DOCUMENTS

| CN | 205239618 U | 5/2016 |
|---|---|---|
| DE | 720718 C | 5/1942 |

(Continued)

OTHER PUBLICATIONS

Walter Singer, Steering column with incorporated switches—has axial corrugations in steering wheel region to act as bearing supports, Jan. 20, 1977, EPO, DE 2 530 189 A!, Machine Translation of Description (Year: 1977).*

(Continued)

*Primary Examiner* — James A English
(74) *Attorney, Agent, or Firm* — thyssenkrupp North America, LLC

(57) ABSTRACT

A steering column for a motor vehicle may include a steering shaft that is rotatably supported in a cover unit, an interface for fitting a steering column switch fixed relative to the cover unit, and a transmission element connected to the steering shaft so as to conduct torque by way of a securing means. The transmission element may include actuation means that is movable into operational engagement with the steering column switch fitted to the interface. The transmission (Continued)

element may be constructed in one piece together with at least one securing means for a rotationally secure connection to the steering shaft.

12 Claims, 4 Drawing Sheets

(56) References Cited

U.S. PATENT DOCUMENTS

| | | | | |
|---|---|---|---|---|
| 5,437,350 | A * | 8/1995 | Sallez | B60R 25/0222 180/287 |
| 6,246,128 | B1 * | 6/2001 | Sugata | B60R 16/027 200/61.54 |
| 7,574,940 | B2 * | 8/2009 | Ridgway | B62D 1/16 180/287 |
| 9,126,622 | B2 * | 9/2015 | Hebenstreit | B62D 1/20 |
| 2015/0323014 | A1 * | 11/2015 | Clark | F16D 1/101 403/14 |

FOREIGN PATENT DOCUMENTS

| | | |
|---|---|---|
| DE | 25 30 189 A | 1/1977 |
| DE | 199 20 994 A | 11/1999 |
| EP | 0 533 141 A | 3/1993 |
| EP | 0 965 492 A | 12/1999 |

OTHER PUBLICATIONS

English Translation of International Search Report issued in PCT/EP2016/075325, dated Dec. 20, 2016 (dated Jan. 4, 2017).

* cited by examiner

STEERING COLUMN FOR A MOTOR VEHICLE AND METHOD FOR PRODUCING A STEERING COLUMN

CROSS REFERENCE TO RELATED APPLICATIONS

This application is a U.S. National Stage Entry of International Patent Application Serial Number PCT/EP2016/075325, filed Oct. 21, 2016, which claims priority to German Patent Application No. DE 10 2015 220 934.2, filed Oct. 27, 2015, the entire contents of both of which are incorporated herein by reference.

FIELD

The present disclosure generally relates to steering columns for motor vehicles, including steering columns with a steering shaft that is rotatably supported in a cover unit and an interface for fitting a steering column switch that is fixed relative to the cover unit.

BACKGROUND

In a motor vehicle, the steering column serves firstly to transmit steering commands from the steering wheel which is fitted at the rear end of the steering shaft to the steering gear mechanism, generally with an auxiliary force being coupled to reinforce the manual steering torque introduced into the steering wheel. Furthermore, the cover unit which receives at the bodywork side the rotatable support of the steering shaft generally acts as a carrier for electrical switching and operating elements which can be manually activated during travel, such as, for example, indicator, headlight and windshield wiper switches. To this end, in most cases a plurality of switching and operating elements are combined in a steering shaft switch which is assembled as a modular subassembly on the cover unit.

In order to receive the steering column switch, there is constructed on the cover unit an interface which corresponds to securing devices on the steering column switch and which, for example, may have defined abutment faces, securing elements and the like for positionally correct fixing of the steering column switch to the steering column. The interface is preferably constructed in such a manner that the steering column switch can be assembled during production on the steering column which is already mounted in the vehicle.

In a generic steering column, the steering column switch is not only mechanically secured to the interface, but instead a rotational movement of the steering shaft is also transmitted to the steering column switch in order to actuate switching elements by means of a steering movement, for instance, a return device for independent return of the indicator switch after a turning maneuver. The transmission of the rotational movement is carried out by means of a transmission element which is coupled to the steering shaft in a rotationally secure manner and which has at least one actuation means which protrudes with respect to the steering shaft and which when the steering shaft is rotated cooperates with a corresponding switching element of the steering column switch which is fitted to the interface. For example, the actuation means may have an eccentric cam or journal which, in the event of a rotation of the steering shaft, moves a switching lever or trigger mechanism of the steering column switch.

In the prior art, for example, in DE 199 20 994 A1, a transmission element for a steering column is described. The transmission element which is described therein as a rotary connector has pin-like, axially protruding positive-locking elements which are connected in a positive-locking manner to a steering wheel which is itself secured in a rotationally secure manner to the steering shaft. Although a torque-conducting connection is thereby achieved with the steering shaft, it is disadvantageous that, as a result of the successive connections between the transmission element and steering wheel and between the steering wheel and steering shaft, a high level of complexity for complying with the predetermined tolerance requirements is produced.

From DE 720 718 a steering column is also known having a transmission element which is secured to the steering shaft so as to conduct torque. This transmission element is clamped to the steering shaft by way of a securing means, that is to say, by means of a clamping screw which is radially screwed into the transmission element. It is disadvantageous in this instance that the transmission element and the securing means have to be produced and assembled individually which requires a corresponding production and assembly complexity. Furthermore, the steering column which is disclosed therein has only one integrated electric switching contact and no interface for fitting a steering shaft switch. This arrangement is consequently unsuitable for use in modern motor vehicles.

Thus a need exists for a steering column for a motor vehicle that can be produced and assembled in a simpler and more cost-effective manner.

DETAILED DESCRIPTION

Figure 1:
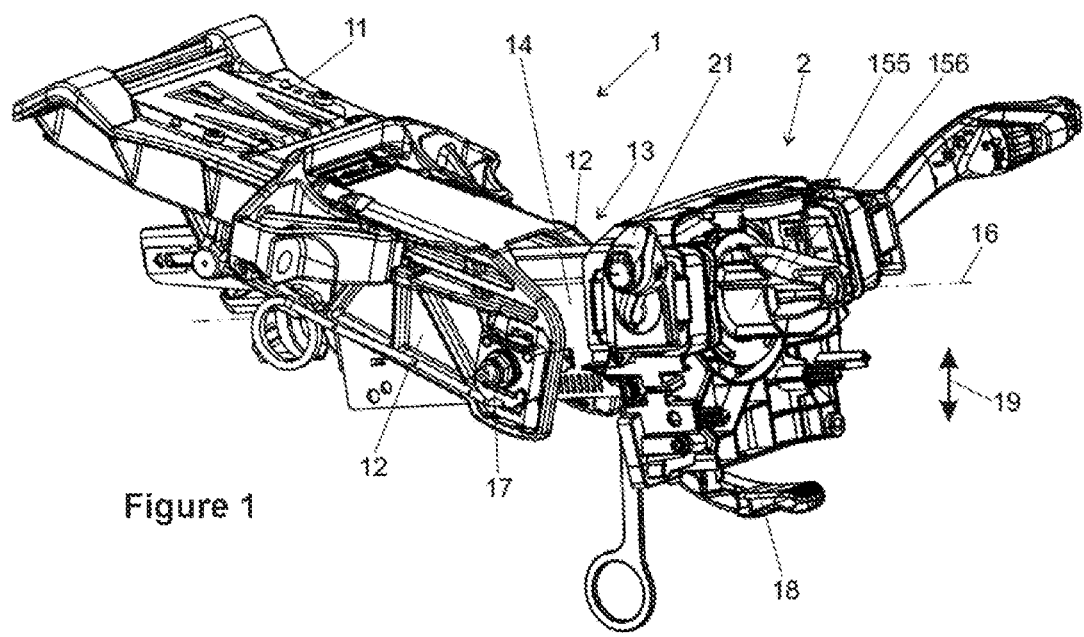
FIG. 1 is a schematic perspective view of an example steering column having a steering shaft switch that is fitted thereto.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to steering columns for motor vehicles. In one example, a steering column may include a steering shaft that is rotatably supported in a cover unit and an interface for fitting a steering column switch that is fixed relative to the cover unit. The steering column may also include a transmission element that is connected to the steering shaft so as to conduct torque by way of a securing means and that comprises at least one actuation means that can be moved into operational engagement with the steering column switch, which is fitted to the interface.

In some examples, the transmission element be constructed in one piece together with at least one securing means for rotationally secure connection to the steering shaft.

According to the invention, the transmission element comprises a single-piece basic structure in which the securing means is/are integrated in one piece. This construction type makes provision for the at least one securing means to be constructed as an integral functional component of the transmission element which, during production, is produced directly on the transmission element. The required functionality for rotationally secure, that is to say, torque-conducting connection to the steering shaft may be provided in this manner simply by the configuration of the transmission element, by means of a corresponding single-piece shaping during the production. The term one-piece is intended to be understood to be a single-piece integral component.

The single-piece construction of the transmission element and securing means according to the invention has the advantage that no further securing means, such as screws, clamping or tensioning elements, have to be produced and provided separately, whereby the production and cost complexity is reduced. Furthermore, the connection of the securing element to the transmission element is dispensed with, whereby the work and time complexity during the production of the steering column is advantageously reduced.

The solution according to the invention is particularly suitable for steering columns which are connected to a steering wheel and which have an integrated superimposition gearbox, a socalled active front steering. These superimposition gearboxes serve to introduce an additional steering angle in the steering shaft.

There may be provision for the securing means to comprise at least one positive-locking element which engages in a corresponding positive-locking receiving member of the steering shaft. A positive-locking element may comprise a projection, journal or the like which is formed in one piece on the transmission element and which protrudes radially and/or axially and which engages in a corresponding radial or axial recess or indentation in the steering shaft, for example, an axial groove, so that with respect to a movement in the peripheral direction a positive-locking, rotationally secure connection is produced. A transposed arrangement with a projection which protrudes radially and/or axially from the steering shaft and which engages in a corresponding recess or indentation of the securing means is also possible, as is a combination of projections and recesses.

It is also conceivable and possible for the securing means to comprise a knurling or profiling which is in abutment in a positive-locking manner against a diametrically opposed surface of the steering shaft so that a micro-positive-locking connection is formed. Furthermore, it is conceivable and possible for the securing means to have a radial knurling and for the steering shaft to comprise a peripheral knurling with protrusions which extend at least partially in the peripheral direction, wherein as a result of pressing the transmission element onto the steering shaft, the axial knurling which is formed as a securing means is introduced into the peripheral knurling of the steering shaft and consequently a positive-locking connection is provided between the transmission element and steering shaft.

The securing means may comprise at least one non-positive-locking element which is connected to the steering shaft in a frictionally engaging manner. The non-positive-locking element comprises a surface of the transmission element which contacts a surface of the steering shaft in a frictionally engaging manner so that, as a result of the active static friction, a torque-conducting connection between the steering shaft and transmission element is produced. A nonpositive-locking element may be provided, for example, by means of an axial through-opening by means of which the transmission element is pressed in an axial direction onto a securing portion of the steering shaft.

The securing means may have integrally constructed positive-locking and non-positive-locking elements in combination. The securing portion of the steering shaft to which the transmission element is secured is preferably constructed so as to correspond to the securing means of the transmission element. This is intended to mean that there are arranged in the securing portion positive-locking receiving members and/or non-positive-locking receiving members which can be connected in a torque-conducting manner to the securing means of the transmission element.

It is further possible for the securing means to comprise at least one resilient element. A resilient element may be clamped between the transmission element and the steering shaft so that the transmission element is resiliently supported against the steering shaft. The resilient force which is applied against the surface of the steering shaft may bring about a defined non-positive-locking connection between the transmission element and the steering shaft. Furthermore, any play which is present between the transmission element and steering shaft can also be compensated for so that the transmission element is resiliently fixed in a radial direction, even when the actual torque-conducting connection is carried out via positive-locking elements. It is also conceivable and possible for a resilient element to clamp a positive-locking element in positive-locking engagement in a resilient manner so that a secure and play-free fit is ensured. The resilient element is preferably constructed in an integral manner with the transmission element.

There are preferably arranged on the transmission element a plurality of resilient elements which in a state distributed over the periphery in a rotationally symmetrical manner are resiliently pretensioned radially against the outer covering face of the steering shaft. In a particularly preferred manner, three resilient elements are each arranged offset with respect to each other through 120° with respect to the periphery of the steering shaft so that the transmission element is retained in a centered manner on the steering shaft by means of the radial resilient forces. Alternatively, four, five or six resilient elements may also be provided.

The resilient element(s) is/are preferably formed in an integral manner on the transmission element, for example, in an annular or tubular portion of the securing means in the form of slotted segments so that there are formed resilient tongues which can be supported in a resilient manner against the steering shaft.

In its basic form, the transmission element may be constructed in an annular manner and at least partially engage around the steering shaft in a peripheral direction. There is thereby formed a ring which is coaxially fitted and fixed on the steering shaft with the through-opening thereof. The ring is preferably closed and completely surrounds the steering shaft. In the region of the through-opening, the securing means may be produced according to the invention integrally on the ring. In this instance, at least one securing means is arranged on a face of the transmission element facing the outer side of the steering shaft, preferably on an inner face of the through-opening which is opposite an outer face of the steering shaft. The inner and outer faces may comprise inner and outer covering faces which are opposite each other in a radial direction, or end faces of the transmission element and the steering shaft which face each other in an axial direction.

The transmission element may comprise an annular element in the form of a flat annular disk, having a radial annular width which is measured between the edge of the through-opening and the outer periphery and which is greater than or equal to the annular thickness in an axial direction of the through-opening. In the region of the through-opening and/or the end faces, a securing means according to the invention may be integrally formed on or in. At least one actuation means may be arranged in the radially outwardly protruding region, preferably in the outer peripheral region. The actuation means may, for example, comprise a radially inwardly formed recess in which a corresponding switching element of a steering shaft switch which is fitted to the interface engages in a radial direction in a positive-locking manner.

It is advantageous for the securing means to comprise a securing sleeve in the form of a tubular portion. According to the invention, the securing sleeve is configured in one piece with the transmission element, for example, integrally formed. With the through-opening thereof which corresponds to the cross-section of the steering shaft in a securing portion, the securing sleeve may be arranged and secured coaxially on the steering shaft. In the region of the axial extent thereof, the securing sleeve may have as securing means one or more positive-locking elements and/or non-positive-locking elements and/or resilient elements which can be connected to the steering shaft. Preferably, they are arranged on the inner face of the through-opening thereof so that they can be secured to the outer covering face of the steering shaft. For example, the annular securing sleeve in order to form a non-positive-locking connection with press-fit can be pressed axially onto the steering shaft, wherein the axial dimension is selected to be so large that in a peripheral direction a fixed frictionally engaging connection can be carried out. Alternatively or additionally, there may be arranged on the securing sleeve one or more positive-locking elements which can be brought into engagement with corresponding positive-locking receiving members on the steering shaft in an axial direction. These positive-locking elements may, for example, comprise one or more projections which protrude radially into the passage cross-section and which can be inserted in an axial direction in corresponding axial grooves in the outer covering face. Alternatively or additionally, there may be arranged on the securing sleeve one or more resilient elements which resiliently protrude, for example, in a radially inward direction with respect to the passage cross-section. A resilient element may, for example, be produced by axial slots which are arranged with spacing with respect to each other being introduced into the tubular securing sleeve at one end in a peripheral direction so that the web which remains therebetween forms a leaf spring or resilient tongue which can be moved with the free end thereof resiliently in a radial direction. In this manner, two or more axial slots may also be introduced in a state distributed over the periphery so that the securing sleeve is segmented over the entire periphery thereof and the segments between the slots form a number of leaf springs or resilient tongues which corresponds to the number of slots. As a result of the fact that the resilient tongues are formed and sized in such a manner that they protrude radially inward in the unloaded state, when they are axially placed on a steering shaft they are splayed radially outward and are in abutment with radial pretensioning against a securing portion of the steering shaft. A defined non-positive-locking can thereby be produced between the securing means of the transmission element and the steering shaft. Alternatively or additionally, as a result of the resilient elements, positive-locking elements such as those described above may be pretensioned in a resilient manner against each other. Furthermore, radial play between the transmission element and the steering shaft can be compensated for and the transmission element can be held in a resiliently centered manner on the steering shaft.

The securing sleeve may extend in an axial direction from an annular element of the transmission element, for example, in the form of a ring or an annular disk, wherein the annular element protrudes in a radial direction over the securing sleeve. The annular element may preferably have on the outer periphery thereof at least one actuation means which has, for example, a radially formed recess.

An advantageous embodiment makes provision for the transmission element to be constructed as a sheet metal component. According to the invention, such a molded sheet metal component including the securing means can be produced in a particularly rational manner by means of punching and/or optionally cold forming, preferably from sheet steel or spring steel sheet. An advantage of this production method is that, as a result of the shaping, the mechanical properties can be adapted in a selective localized manner to the loads which occur, for example, by means of shaping beads or edges, the flexural strength can be increased locally, or by means of embossings the material thickness can be reduced in order to reduce the rigidity. It is thereby possible, for example, to adjust and adapt the resilient force of the resilient elements mentioned above.

A transmission element which is constructed as a molded sheet metal component, preferably of sheet steel or spring steel sheet may comprise part-regions in which the material properties of the remaining regions are constructed in a different manner. The part-regions may, for example, have a greater or lesser hardness. Such an adjustment of the material properties may, for example, be carried out by means of local thermal processing, such as, for example, by means of laser beam hardening. It is thereby, for example, possible to adjust the retention force of the securing means on the steering shaft by means of local change of the hardness.

At least one actuation means—for example, comprising radial and/or axial formations, recesses and/or projections—may also be formed in an integral manner as a molded sheet metal component with the transmission element. Alternatively, the production as a press or cast component may also be carried out integrally with one or more securing elements.

The transmission element may alternatively be formed as a molded plastics material component. The production as an injection-molded component provides great configuration freedom in terms of the single-piece shaping so that securing means according to the invention and where applicable also actuation means can be readily integrated in one piece. A sufficient durability can be achieved by means of the selection of plastics materials with corresponding material properties, wherein, in order to increase the strength, reinforcement fibers can be added, such as, for example, glass or carbon fibers. A particularly light construction can thereby be achieved.

The interface preferably comprises on the cover unit a receiving portion which is arranged in an axial direction adjacent to the transmission element. The receiving portion may, for example, comprise a cylindrical or prismatic region which is arranged coaxially relative to the steering shaft and on which the steering shaft switch, also referred to synonymously as a steering shaft switch module, can be fitted in an axial direction with a receiving member which corresponds in terms of shape and dimensions. For assembly on the steering column which is already installed in the motor vehicle, before the steering wheel is fitted the steering shaft switch module is fitted and fixed from the steering-wheel-side rear end to the receiving portion of the cover unit, for example, by means of an engagement, screw connection or clamping. In order to ensure a clear orientation with respect to the steering axle, the receiving portion and the corresponding receiving member on the steering shaft switch are provided with positive-locking elements which can be joined together only in a defined rotation position with respect to the steering axle. In order to simplify the assembly of the steering shaft switch, an auxiliary assembly member in the form of a profiled sleeve can be placed on the steering-wheel-side end of the steering shaft. The auxiliary assembly member comprises a guide channel which extends starting from the steering-wheel-side end of the steering shaft to the actuation means of the transmission element. Preferably, the guide channel narrows starting from the steering-wheel-side end of the steering shaft to the actuation means of the transmission element so that a type of introduction funnel is provided.

A method according to the invention for producing a steering column for a motor vehicle, having a steering shaft which is rotatably supported in a cover unit and an interface for fitting a steering shaft switch which is fixed relative to the cover unit, and having a transmission element which is connected in a torque-conducting manner to the steering shaft by way of securing means, and which comprises at least one actuation means which can be brought into operational engagement with the steering shaft switch which is fitted to the interface, makes provision for the transmission element, which together with at least one securing means is constructed in one piece for connection to the steering shaft, to be fitted in an axial direction to the steering shaft and without additional connection means to be fixed directly in a rotationally secure manner to the steering shaft so as to be self-retaining.

In contrast to the prior art, in which an initially separate connection means first has to be connected to the transmission element and, during assembly, the transmission element has to be fixed on the steering shaft by clamping the connection means, the transmission element according to the invention is produced and provided in one piece and in a production step is axially placed on the steering shaft. As a result of the integral construction of the securing means, other operating steps are superfluous. The production of a steering column is thereby possible in a more rational manner.

For example, the transmission element can be pressed with the securing means in a frictionally engaging manner in an axial direction onto the securing portion of the steering shaft. Alternatively or additionally, one or more positive-locking elements which are formed on the securing means of the transmission element can be moved into engagement with corresponding positive-locking receiving members on the transmission element in an axial direction.

In order to produce the steering column, after the transmission element has been fixed a steering shaft switch can be fitted to the interface of the cover unit indirectly or directly, wherein an actuation means of the transmission element is moved into actuation engagement with the steering shaft switch.

FIG. 1 shows a steering column 1 according to the invention as a perspective view obliquely toward the rear end on which in the vehicle a steering wheel which is not illustrated in this instance is assembled.

Via the retention unit 11, the steering column 1 can be secured to a vehicle bodywork which is not illustrated in this instance. The retention unit 11 has two downwardly protruding side members 12 between which the outer cover pipe 14 of an actuation unit 13 is arranged. In the cover pipe 14, a steering shaft 15 is rotatably supported about the longitudinal axis 16 thereof. At the rear end region of the steering shaft 15, a portion 151 for fitting a steering wheel which is not illustrated is formed.

By means of a clamping device which has a clamping axle 17 which extends through both side members 12 transversely relative to the longitudinal axis 16, the side members 12 can be pressed by means of manual movement of an actuation lever 18 from the outer side against the cover pipe 14 and consequently tensioned. Different construction types of clamping devices which implement a rotational movement of the actuation lever 18 in order via the clamping axle 17 to pull the side members against each other are known in the prior art, for example, as cam or tilting pin clamping devices. In the secured state of the clamping device, the cover pipe 14 is clamped between the side members 12 and consequently the actuation unit 13 is connected to the retention unit 11 in a non-positive and/or positive-locking manner so that the steering wheel position is fixed in the vehicle inner space. In the released state of the clamping device, the clamping connection to the retention unit 11 is released so that the actuation unit 13 can be adjusted relative to the retention unit 11 in the direction of the longitudinal axis 16 and in most cases also transversely relative thereto in the vertical direction 19.

There is fitted to the actuation unit 13 a steering shaft switch 2 which is constructed as a steering shaft switch module which generally combines a plurality of electrical switching devices, in the illustrated embodiment, for example, an indicator switch 21 with a manually actuatable switch lever, and, for example, a headlight switch, also with a switch lever.

Figure 2:
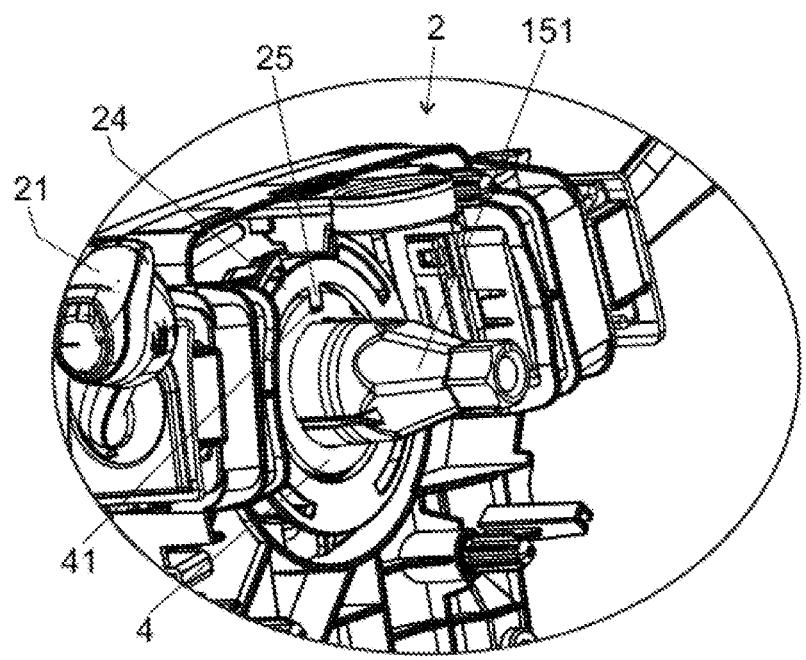
FIG. 2 is a detail view of the example steering column of FIG. 1.
Figure 3:
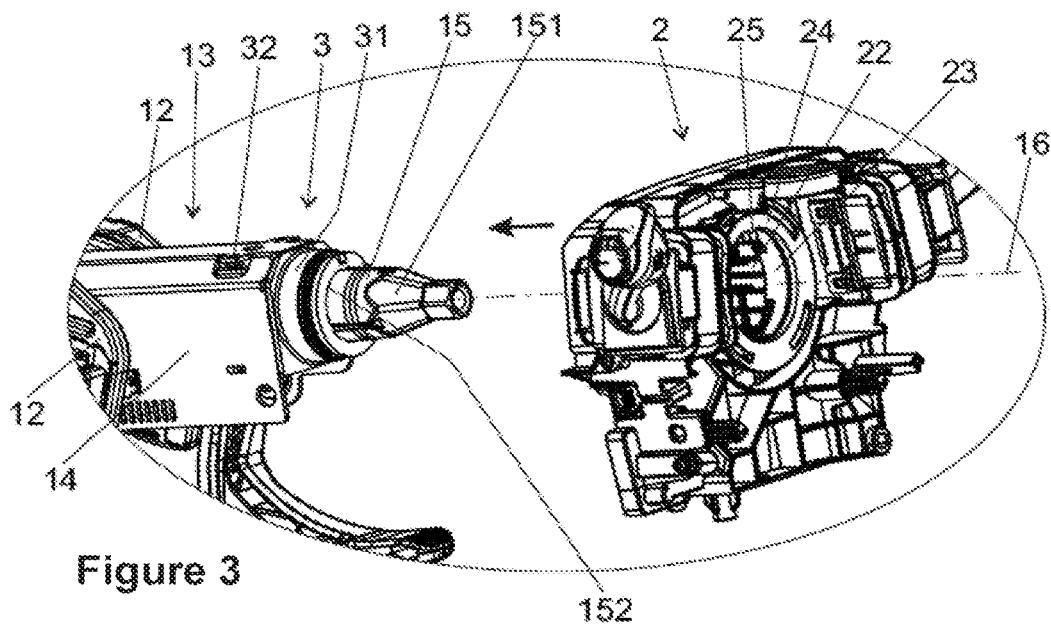
FIG. 3 is a detail view of the example steering column of FIG. 1 in an axially-separated state.

FIGS. 2 and 3 show detailed views of the steering column 1, wherein FIG. 3 shows a separated view prior to assembly. The steering shaft switch 2 has a continuous securing opening 22 which for assembly is placed from the rear parallel with the longitudinal axis 16 on an interface 3 which is formed on the actuation unit 13, as indicated in FIG. 3 with the arrow. The interface 3 has in the example illustrated a cylindrical receiving portion 31 on the cover pipe 14 which can be inserted coaxially in a positive-locking manner in a corresponding hollow-cylindrical counter-portion 23 in the securing opening 22. Furthermore, there may be provided on the cover pipe 12 assembly openings 32 which can be connected by means of corresponding assembly elements to the steering shaft switch 2.

On a securing portion 152 of the steering shaft 15, a transmission element 4 according to the invention is fitted in a rotationally secure manner in the region of the interface 3. The transmission element 4 is located in the direction of the longitudinal axis 16 adjacent to the receiving portion 31 so that it can be rotated together with the steering shaft 15 relative to the receiving portion 31 about the longitudinal axis 16.

The steering shaft switch 2 has a plurality of electrical switch elements which can be operated manually, including the indicator switch 21.

In the region of the through-opening 22, the steering shaft switch 2 has a carrier element 24 which in the assembly state shown in FIG. 2 is located in the region of the interface 3 so that it is in torque-conducting operational engagement with the transmission element 4. To this end, the carrier element 24 may have a journal 25 which protrudes radially inward into the through-opening 22 and which engages with respect to the peripheral direction in a positive-locking manner in a corresponding actuation means of the transmission element 4 which in the example illustrated is constructed as a radial formation 41 in the outer periphery of the transmission element 4. In order to improve the assembly of the steering shaft switch 2, an auxiliary assembly member 155 in the form of a profiled sleeve which is formed from plastics material can be used, wherein the auxiliary assembly member 155 is placed prior to the assembly of the steering shaft switch 2 on the portion 151 of the steering shaft 15. The auxiliary assembly member 155 comprises a guide channel 156 which narrows from the steering-wheel-side end of the steering shaft. The guide channel 156 guides the journal 25 of the steering shaft switch module 2 during the assembly to the formation 41 of the transmission element 4. Consequently, the guide channel 156 acts as an auxiliary introduction member for the coupling between the journal 25 and the formation 41. Consequently, the assembly can be carried out in a secure and simple manner. After the assembly of the steering shaft switch, the auxiliary introduction member 155 can be readily removed from the portion 151 of the steering shaft 15 and subsequently the steering wheel can be assembled.

The carrier element 24 acts as an actuator for a return device of the indicator switch 21 which is not illustrated in detail. The return device deactivates the switched-on indicator switch 21 independently when the steering shaft 15 is turned back after a turning maneuver.

Figure 4:
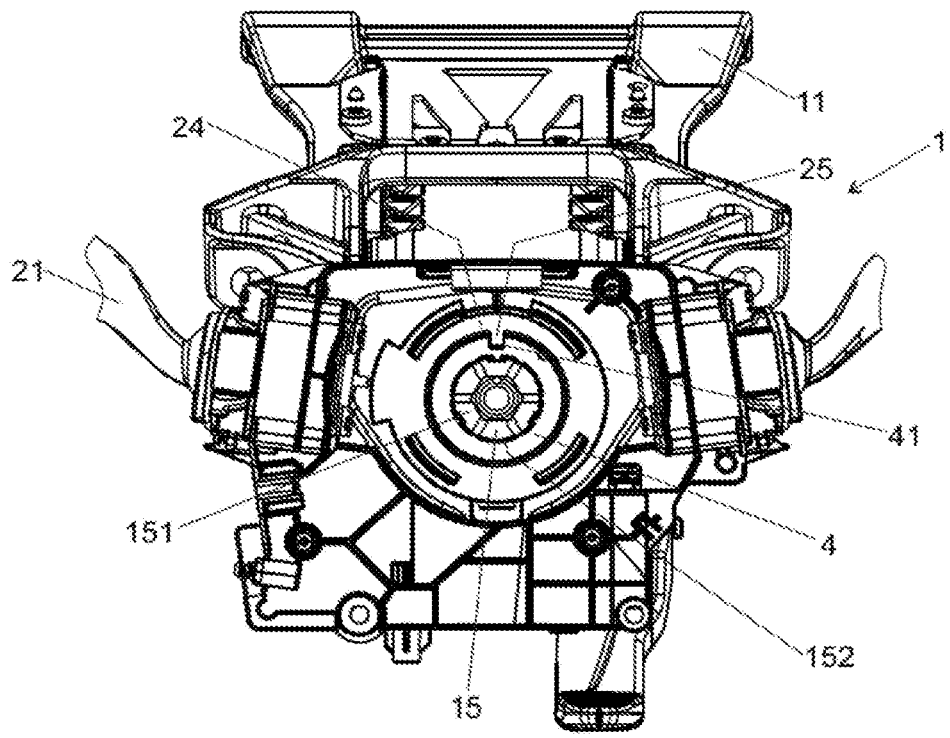
FIG. 4 is an axial view of a rear end of the example steering column of FIG. 1.

FIG. 4 shows the assembled state from FIG. 2 again as an axial view from the rear. It can be seen how the carrier element 24 engages with the journal 25 radially in the formation 41 and is thereby connected to the transmission element 4 in a torque-conducting manner.

Figure 5:
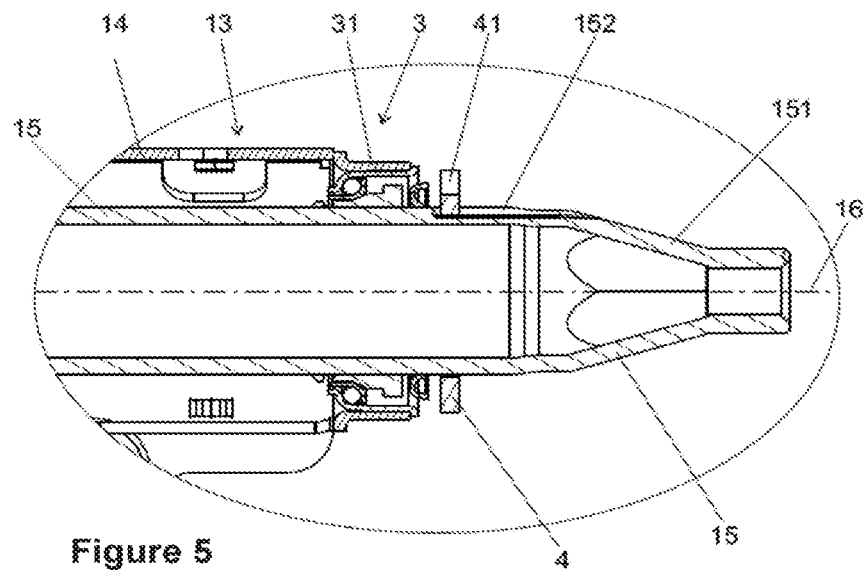
FIG. 5 is a partial longitudinal sectional view in a direction of a longitudinal axis through the example steering column of FIG. 1.

In FIG. 5, a longitudinal section through the actuation unit 13 in the region of the interface 3 is illustrated. It can be seen therein how the transmission element 4 is fitted on the securing portion 152 of the steering shaft 15 axially adjacent to the receiving portion 31 of the cover pipe 14. The coupling between the cover pipe 14 and the steering shaft switch 2 is, however, not carried out exclusively via the receiving portion 31.

In an embodiment which is not illustrated, the steering shaft switch is secured to a metal plate which is orientated orthogonally with respect to the longitudinal axis of the steering shaft and which is secured to the cover pipe. Other interfaces between the cover pipe and the steering shaft switch are also conceivable and possible and sufficiently known from the prior art.

Figure 6:
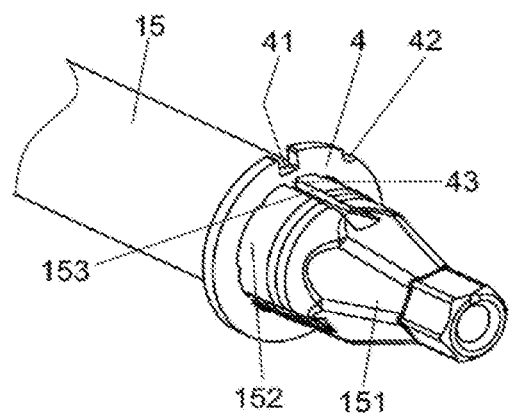
FIG. 6 is a schematic perspective view of an example steering shaft.
Figure 7:
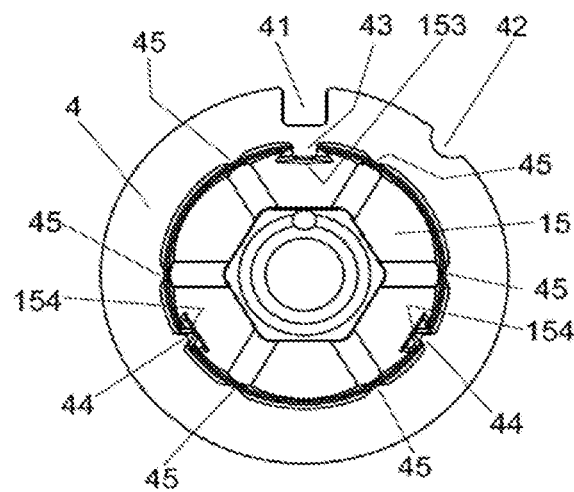
FIG. 7 is an axial view of the example steering shaft of FIG. 6.

The specific configuration of the transmission element 4 according to the invention becomes clear together with the illustrations in FIGS. 6 and 7. Accordingly, this embodiment of the transmission element 4 is constructed in an annular manner and has the basic shape of a flat circular ring or an annular disk which extends parallel with a radial plane of the steering shaft 15. This embodiment of the transmission element may, for example, be constructed as a molded sheet metal component, preferably from sheet steel.

As already mentioned above, the transmission element 4 has in the outer periphery thereof a radial formation 41 which forms an actuation means for torque-conducting coupling to the carrier element 24 of the indicator switch 21. There may be provided at least one other recess 42, where applicable also a plurality, for example, for actuating corresponding switch elements or the like. The recess 42 may also act as an auxiliary orientation member during the assembly of the transmission element 4 on the steering shaft 15.

For rotationally secure, that is to say, torque-conducting securing to the steering shaft 15, the transmission element 4 has a positive-locking element 43 which protrudes radially into the annular opening thereof, and which engages in the corresponding longitudinal groove 153 in the securing portion 152 in a positive-locking manner. In addition, additional positive-locking elements 44 which engage in longitudinal grooves 154 may be provided.

Furthermore, the securing means may comprise centering projections 45 which also protrude radially inward into the open annular cross-section. Preferably, a plurality, in the example shown, six, of the centering projections 45 are arranged in a state distributed over the periphery. The centering projections 45 do not engage in a positive-locking manner, but are instead supported in a radial direction on the cylindrical outer periphery of the steering shaft 15 and can ensure as non-positive-locking elements a frictionally engaging connection.

The positive-locking elements 43, 44 and the centering projections 45 form securing means according to the invention which are constructed in an integral manner with the transmission element 4. The transmission element 4 which is in the form of an annular disk in terms of its basic shape may be constructed as a stamped sheet metal component, preferably of sheet steel.

Figure 8:
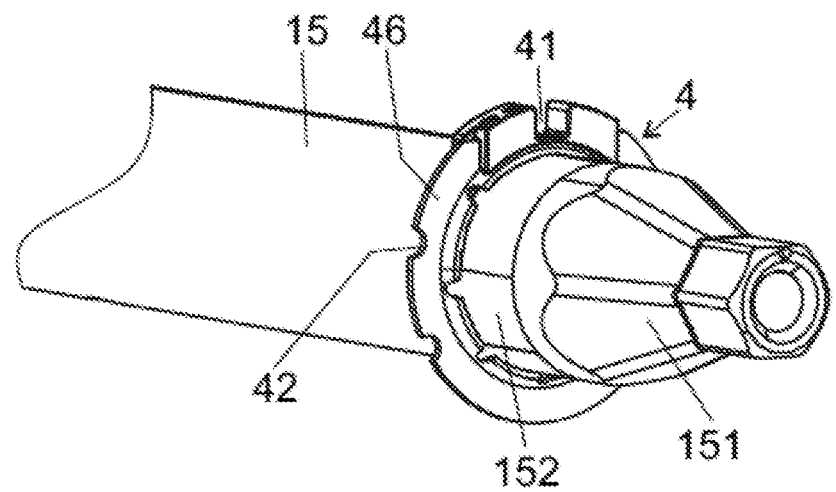
FIG. 8 is a schematic perspective view of another example steering shaft.
Figure 9:
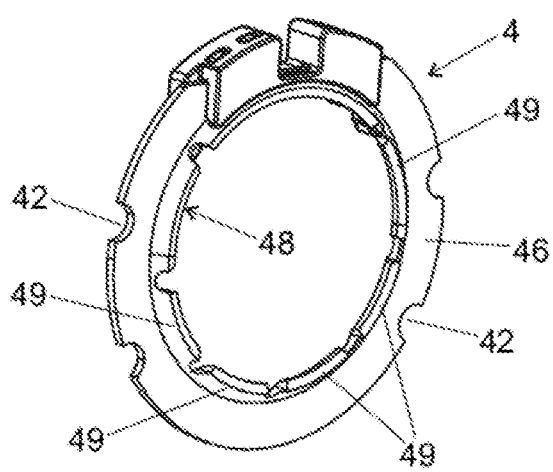
FIG. 9 is a schematic perspective view of an example transmission element of the steering shaft of FIG. 8 in a removed state.
Figure 10:
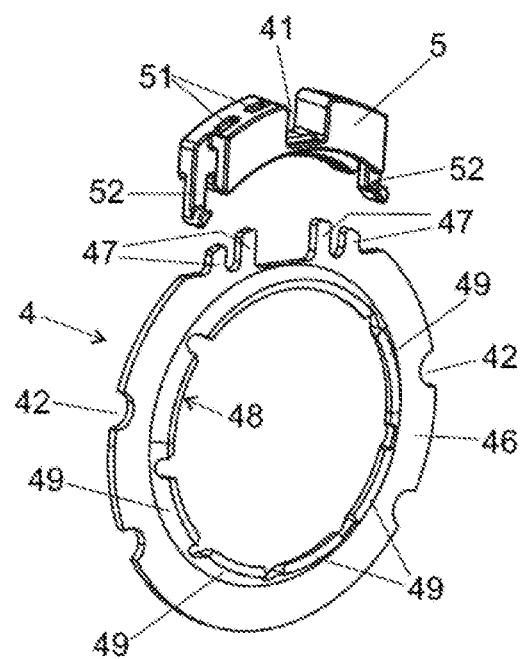
FIG. 10 is a schematic perspective view of the example transmission element of FIG. 9 in a separated state.

Another embodiment of a transmission element 4 according to the invention is illustrated in FIGS. 8, 9 and 10. This also has a flat annular disk 46 which has formations 42 in the outer periphery thereof. In place of the formation 41 of the first embodiment, there are provided in this instance engagement elements 47 to which there can be fitted in a radial direction an adapter piece 5 which itself has the formation 41 for coupling to the carrier element 24 of the steering shaft switch 2.

For connection to the transmission element 4, the adapter piece has connection openings 51 in which the engagement elements 47 can be received in order to position and retain the adapter piece 5. Furthermore, it comprises in an axial direction resilient locking elements 52 which can be brought axially into engagement with the through-opening of the annular disk 46 so that the adapter piece 5 is securely engaged on the transmission element 4.

There is on the annular disk 46 a tubular-portion-like, conically converging securing sleeve 48 which has multiple slots over the periphery thereof in order to form a plurality of segment-like resilient elements 49. The passage cross-section which is formed inside these resilient elements 49 is sized in such a manner that the securing sleeve 48 can be axially pressed onto the securing portion 152 of the steering shaft 15, wherein the resilient elements 49 as a result of their resilient force bring about a non-positive-locking connection of the transmission element 4 to the steering shaft 15, that is to say, form non-positive-locking elements for frictionally engaging connection and consequently securing means in the context of the invention.

According to the invention, the resilient elements 49 are constructed integrally with the transmission element 4. Preferably, the second illustrated embodiment of the transmission element 4 is also constructed as a sheet metal component, preferably as a cold-formed pressed and punched component of sheet steel or spring steel sheet.

The adapter component 5 which is optionally provided may, for example, be constructed as a plastics material injection-molded component which can be produced in a favorable manner and which enables particularly simple structural adaptation of a single-piece transmission element 4 according to the invention to different types of steering columns 1 or embodiments of steering shaft switches 2.

The solution according to the invention is not limited to a steering column which can be adjusted manually in a vertical and/or longitudinal direction. Instead, the solution according to the invention may, for example, also be used with steering columns which can be adjusted in a motorized manner or which are non-adjustable.

| List of reference numerals | |
|---|---|
| 1 | Steering column |
| 11 | Retention unit |
| 12 | Side member |
| 13 | Actuation unit |
| 14 | Cover pipe |
| 15 | Steering shaft |
| 151 | Portion |
| 152 | Securing portion |
| 153 | Longitudinal groove |
| 154 | Longitudinal groove |
| 155 | Auxiliary assembly member |
| 156 | Guide channel |
| 16 | Longitudinal axis |
| 17 | Clamping axle |
| 18 | Actuation lever |
| 19 | Vertical direction |
| 2 | Steering shaft switch |
| 21 | Indicator switch |
| 22 | Securing opening |
| 23 | Counter-portion |
| 24 | Carrier element |
| 25 | Journal |
| 3 | Interface |
| 31 | Receiving portion |
| 32 | Assembly opening |
| 4 | Transmission element |
| 41 | Formation |
| 42 | Recess |
| 43 | Positive-locking element |
| 44 | Positive-locking element |
| 45 | Centering projection |
| 46 | Annular disk |
| 47 | Engagement element |
| 48 | Securing sleeve |
| 49 | Resilient elements |
| 5 | Adapter piece |
| 51 | Connection opening |
| 52 | Locking element |

What is claimed is:

1. A steering column comprising:
a steering shaft that is rotatably supported in a cover unit;
an interface for fitting a steering column switch that is fixed relative to the cover unit; and
a transmission element that is securely connected to the steering shaft by way of securing means so as to conduct torque and rotate with the steering shaft, wherein the transmission element is formed as an integral piece with the securing means, the transmission element comprising actuation means that is movable into operational engagement with the steering column switch fitted to the interface.

2. The steering column of claim 1 wherein the integral piece is a single piece.

3. The steering column of claim 1 wherein the securing means comprises a positive-locking element that engages in a corresponding positive-locking receiving member of the steering shaft.

4. The steering column of claim 1 wherein the securing means comprises a non-positive locking element that is connected to the steering shaft in a frictionally engaging manner.

5. The steering column of claim 1 wherein the securing means comprises a resilient element.

6. The steering column of claim 1 wherein the transmission element is annular and at least partially engages around the steering shaft in a peripheral direction.

7. The steering column of claim 1 wherein the securing means comprises a securing sleeve configured as a tubular portion.

8. The steering column of claim 1 wherein the transmission element is a sheet metal component.

9. The steering column of claim 1 wherein the interface comprises on the cover unit a receiving portion that is disposed in an axial direction adjacent to the transmission element.

10. A method for producing a steering column that includes a steering shaft that is rotatably supported in a cover unit, an interface for fitting a steering shaft switch that is fixed relative to the cover unit, and a transmission element that is connected in a torque-conducting manner to the steering shaft by way of securing means and that comprises actuation means configured to be brought into operational engagement with the steering shaft switch fitted to the interface, the method comprising:
fitting the transmission element, which is formed as an integral piece with the securing means for connection to the steering shaft, in an axial direction to the steering shaft; and
fixing the transmission element, without additional connection means, directly in a rotationally secure manner to the steering shaft so as to be self-retaining.

11. The method of claim 10 comprising, after fixing the transmission element to the steering shaft, fitting the steering shaft switch to the interface of the cover unit directly or indirectly, wherein the actuation means of the transmission element is brought into operational engagement with the steering shaft switch.

12. The method of claim 10 wherein the integral piece is a single piece.

* * * * *